No. 641,259. Patented Jan. 16, 1900.
J. BLACK.
PULLEY.
(Application filed June 12, 1899.)
(No Model.)
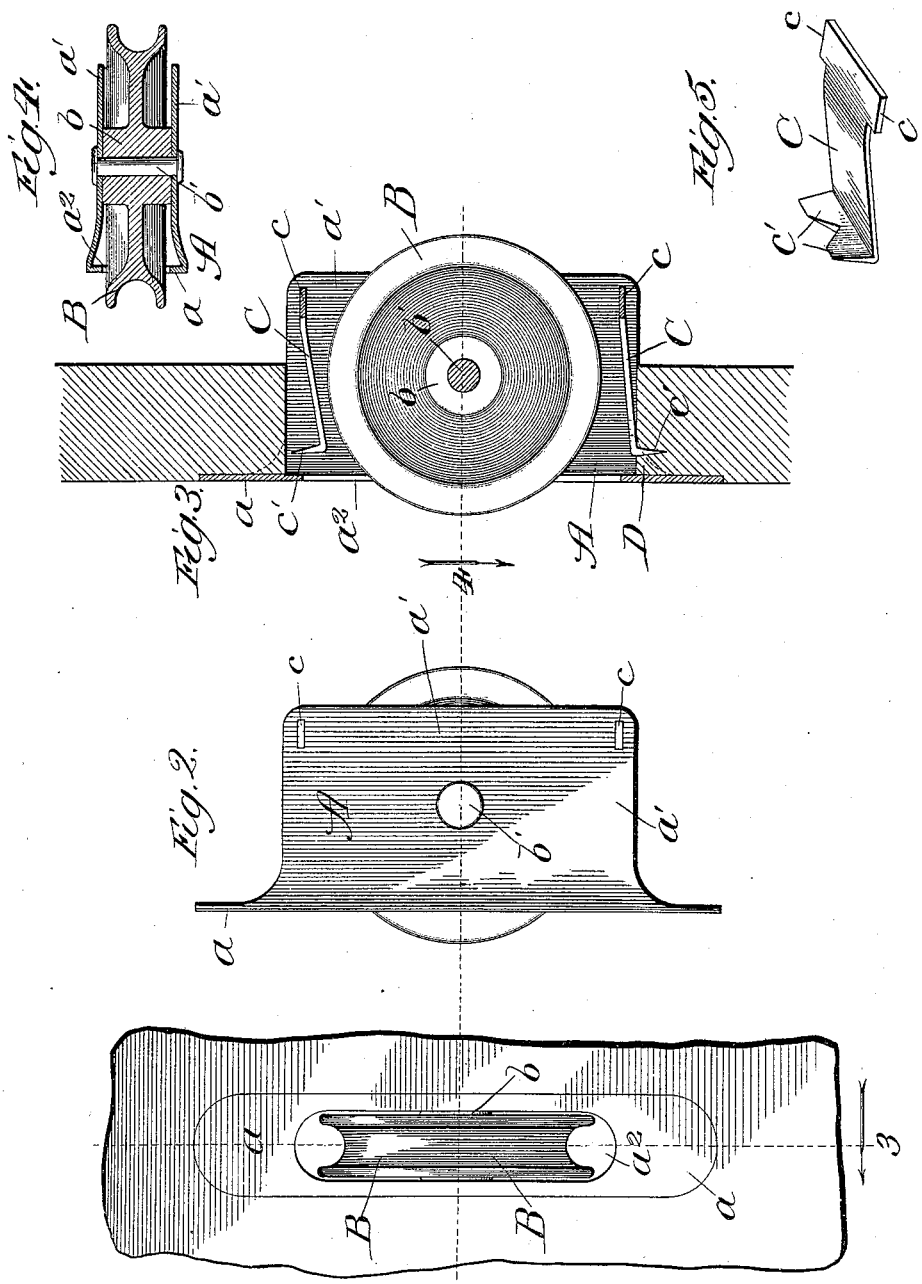
Inventor:
John Black,

UNITED STATES PATENT OFFICE.

JOHN BLACK, OF BLUE ISLAND, ILLINOIS.

PULLEY.

SPECIFICATION forming part of Letters Patent No. 641,259, dated January 16, 1900.

Application filed June 12, 1899. Serial No. 720,178. (No model.)

*To all whom it may concern:*

Be it known that I, JOHN BLACK, a citizen of the United States, residing at Blue Island, Illinois, have invented certain new and useful Improvements in Pulleys, of which the following is a specification.

The object of my improvement is to provide means for attaching or fastening a pulley—as, for instance, a window-sash pulley—in place without the use of screws or similar devices; and my invention consists in the features and details of construction hereinafter described and claimed.

In the drawings, Figure 1 is a front elevation showing a pulley in place in a window-casing. Fig. 2 is a side elevation of the pulley and its frame detached. Fig. 3 is a sectional vertical elevation taken on the line 3 of Fig. 1. Fig. 4 is a plan section taken on the line 4 of Fig. 2, and Fig. 5 is a detached perspective view of one of my fastening-dogs hereinafter described.

In making my improvement in pulleys intended to dispense with the screws usually employed in fastening a window-sash pulley into the window-casing I make a pulley-frame A, which for convenience and cheapness I prefer to make of sheet iron or steel, which may be bent into shape to furnish the front plate $a$ and the rearwardly-extending side plates $a'$, leaving the spaces between them open at the ends, so as to make an open-ended frame. The front plate is provided with an opening at $a^2$, so that the pulley-wheel B may protrude slightly through the same, as shown in Figs. 2 and 3. The pulley-wheel is provided with a hub $b$, which is mounted or journaled in the side pieces of the pulley-frame through means of the pintle or bolt $b'$, holding it in place and permitting it to rotate in the usual manner. Heretofore it has been usually the practice to provide the front plate $a$ of the pulley-frame with holes, through which screws have been inserted into the wood to fasten the pulley-frame and its pulley in place. Instead of this I provide the pulley-frame with dogs C, made, preferably, as shown in Fig. 5. As thus made, the dogs are struck out of sheet metal, with projecting lateral flanges $c$, which are intended to be inserted through holes in the sides of the pulley-frame, as shown in Figs. 2 and 3, so as to fasten and retain the dogs in place. I provide the dogs with teeth $C'$, bent outward at their free ends, as shown in Figs. 3 and 5. These dogs before the pulley-frame is inserted are bent in so that their teeth will not protrude beyond the ends of the sides of the pulley-frame, as shown in the upper dog in Fig. 3. After the pulley and frame have been inserted in place the free ends of the dogs are forced out, so that their teeth are sunk or driven into the wood of the window-casing, as shown in the lower dog in Fig. 3. This may be done by inserting along the channel of the pulley-wheel the end of a blunt tool against the head of the dog and striking it with a hammer. When driven in, the teeth of the dog inclose a portion of the wood, as D, between the front plate of the frame and the teeth of the dog, thus preventing the removal or displacement of the pulley-frame and pulley-wheel. Of course, if desired, only one dog may be used and the other end of the pulley-frame held in the usual way by screws; but I think the use of dogs at each end, as I have described above, will be found the preferable and more economical use of the invention, and such is the way I recommend.

What I regard as new, and desire to secure by Letters Patent, is—

The combination of a pulley-frame having a front plate and rearwardly-extending side plates, a pulley-wheel mounted or journaled in the side plates, and a dog or dogs fastened to the side plates near the rear edge of the same and having their free ends bent outwardly at substantially right angles and lying within the ends of the plates before the pulley-frame is inserted in place for use and adapted to be forced outward beyond the ends of the side plates to attach and fasten the pulley-frame in place, substantially as described.

JOHN BLACK.

Witnesses:
THOMAS A. BANNING,
THOMAS B. MCGREGOR.